United States Patent Office 3,575,852
Patented Apr. 20, 1971

3,575,852
METHOD FOR TREATING WASTE WATER CONTAINING DISSOLVED PHOSPHATES
John Hughes, Glenview, Ill., assignor to American Colloid Company, Skokie, Ill.
No Drawing. Filed June 6, 1969, Ser. No. 831,243
Int. Cl. C02b 1/16
U.S. Cl. 210—28                    10 Claims

ABSTRACT OF THE DISCLOSURE

An inexpensive process for removing dissolved phosphates from waste water by precipitating same which includes adding to said waste water a mixture of lime and cation exchange material having a cation exchange capacity of at least about 20 milliequivalents per 100 grams of cation exchange material, thereby precipitating the soluble phosphates as insoluble phosphate salts.

BACKGROUND OF THE INVENTION

As our civilization grows more complex and sophisticated the problem of treating waste water to prevent pollution becomes a greater and greater problem. As is well-known, the new detergents have created an even more difficult problem in treating waste water so as to prevent pollution of our lakes, rivers and even oceans.

In the newer detergents various phosphates have been added as builders. For example, trisodium phosphate is now utilized in a great many detergents in order to prevent hydrolysis of the detergent (which lowers the effective detergent power). Also included among the so-called alkali builders is tetrasodium pyrophosphate.

In addition, various commercial firms add a significant amount of phosphates to waste water.

The problem of phosphate in waste water has become such a problem that it is now a priority item in the Federal Water Pollution Control Administration's attack on pollution problems. For example, the presence of phosphates in sewage plant effluent is recognized to be a hazard to aquatic life. The presence of the phosphate causes an ecological imbalance resulting in a phenomenon known as eutrophication (the accelerated ageing of bodies of water).

In view of the foregoing it is therefore not surprising that various workers in the art have taken an interest in solving this problem of removing dissolved phosphates from waste water. However, various proposals heretofore made have not been entirely satisfactory because, inter alia, they have been exceedingly expensive.

For example, I have attempted to remove at least 80% of dissolved phosphates in commercial waste water containing about 10 parts per million of dissolved phosphates utilizing lime. It was discovered that in order to remove only 40% of the phosphates (i.e. 4 parts per million) it required 150 parts per million of lime (CaO or $Ca(OH)_2$). Since lime is relatively expensive and since it is generally necessary to remove more than 40% of the phosphate this method is less than satisfactory.

Although all of the reasons for the poor performance on the part of lime in removing dissolved phosphate from waste water is not known, one of the reasons is the fact that lime, in significant amounts, will not react with the phosphate in order to form insoluble salts until the pH is raised to about 9.5. Unfortunately, prior to this point, lime is affected by other substances in the water, such as dissolved gasses (e.g. $CO_2$), dissolved salts such as hardness causing substances (e.g. $Ca(HCO_3)_2$ or $Mg(HCO_3)_2$) which causes an excess loss of the lime. Other factors are also involved to a greater or lesser extent.

In addition to the removal of the phosphates by the addition of lime, other chemical methods for removing dissolved phosphates, e.g. the addition of alum, have also proved to be unsatisfactory. Nevertheless, in view of the ease and convenience of utilizing chemical methods for removing dissolved phosphates from water this still would be the preferred method if any reasonable economic way could be developed.

SUMMARY OF THE INVENTION

It is a principal object of the present invention therefore to disclose and provide an economical chemical method for removing dissolved phosphates from waste water utilizing lime.

It is another object of the present invention to disclose and provide a method for removing dissolved phosphates from waste water utilizing a composition which will form insoluble salts of phosphate, thereby precipitating same, at a pH lower than 9.5, e.g. less than about 9.

It is a further object of the present invention to disclose and provide a composition which will remove at least 90% of dissolved phosphate in waste water without significantly reacting with $CO_2$ or hardness causing materials.

It is still another and further object to provide a synergistic composition of matter for removing dissolved phosphate in water.

The foregoing objects, and others, are accomplished by the present invention by providing a mixture composed of lime and a cation exchange material which, when added to waste water containing soluble phosphates, react with said phosphates to form insoluble phosphate salts without being substantially affected by other materials contained in the water such as $CO_2$ and various dissolved calcium and magnesium bicarbonates.

DESCRIPTION OF THE PREFERRED EMBODIMENTS

The process of this invention can be applied to any type of waste water containing dissolved phosphates but it is particularly adapted to treating sewage effluent containing phosphates primarily derived from the newly developed detergents.

Municipal sewage effluent is usually disposed of by dilution, the waste being dumped into an available body of water such as a river or lake where the already present oxygen would in time destroy the sewage. However, at present, it is normal to pretreat the municipal sewage effluent prior to its being dumped into the large body of water. However, this pretreatment does not remove phosphate from the waste water and therefore contaminates the large body of water in which the waste water is dumped and thereby, as aforesaid, contaminates the large body of water.

It is contemplated that the process of this invention will be applied to sewage waste water prior to its being dumped into a large body of water; either before, during or after pretreatment; however, the process may be utilized anytime it is desired to remove dissolved phosphate from water regardless of the end use of the water.

Removing phosphate from sewage waste water presents certain problems because sewage waste water contains a great deal of dissolved substances such as $CO_2$, magnesium bicarbonate and calcium bicarbonate. Therefore, treatment of sewage disposal is rather unique because if the sewage is to be disposed of in a large body of water it is only necessary to remove the phosphates therefrom but not the other dissolved substances referred to above.

The present invention removes phosphates from sewage waste water by employing a mixture of lime and a cation exchange material having a cation exchange capacity of at least about 20 milliequivalents per 100 grams of cation exchange material.

When the term lime is utilized in the present specification and claims it includes all forms of lime such as quicklime (CaO) and slaked lime (Ca(OH)$_2$).

It is vitally necessary in the present invention to include with the lime a certain amount of a cation exchange material which has a cation exchange capacity of at least about 20 milliequivalents per 100 grams of cation exchange material. Utilizing a mixture of lime and cation exchange material increases the removal of dissolved phosphates from waste water by as much as 100% as compared with utilizing lime per se.

At the present time it is believed that there is some inner action between the calcium in the lime and the cation exchange material which is responsible for the synergistic action and the vastly improved results.

It has been found that as little as 10% of cation exchange material added to lime produces the effects noted above; however, it is preferred that at least 15%, by weight, of cation exchange material be added to lime to produce a mixture containing say from 50% to 80% lime and from 50% to 20% cation exchange material. Thus, an effective range of concentration would be a mixture of lime and cation exchange material in which lime is present in an amount of from 90% to 50% and the cation exchange material is present in an amount of from 10% to 50% and the preferred range would be the composition containing from 80% to 50% lime and from 20% to 50% cation exchange material (all percentages, unless expressly stated otherwise, are by weight).

Any ion exchange material having the criteria set forth above can be utilized; however, it is preferred that the ion exchange material has a cation exchange capacity of at least about 25 milliequivalents per 100 grams of cation exchange material because this type of material is more efficient.

It is also preferred that the ion exchange material be alumino-silicate clay material because these clays are cheaper, as a general rule, than synthetic cation exchange resins and work equally as well.

The type of clay minerals which have the properties of exchanging cations are well-known in the art and therefore no detailed exemplification thereof will be given; however, certain preferred clay minerals will be listed hereinafter.

Similarly, the exchange capacity of various clay minerals is also known and is measured in terms of milliequivalents per 100 grams. Exchange capacity is determined at neutrality, i.e. pH 7, and is so used herein.

In clay materials the common exchangeable cations are calcium, magnesium, hydrogen, potassium, ammonia, the calcium ion being the most frequent and those clays having exchangeable calcium ions are preferred.

Among the clays which we have studied and which have the requisite cation exchange capacity are: the montmorillonites (e.g. nontronite, hectorite, and saponite), halloysite, illites, vermiculite, sepiolite, attapulgite, palygorskite, chlorites, and zeolites (both natural and synthetic).

Among those materials mentioned above, montmorillonite is a preferred mineral because it has a high cationic exchange capacity (between 80 and 150 milliequivalents per 100 grams of material) and because it is also abundant, easily available and relatively inexpensive. Vermiculite, which is similar to montmorillonite, also has a substantial cation exchange capacity (between 100 and 150 milliequivalents per 100 grams of material).

In speaking of cation exchange capacity, it must be remembered that it varies to some extent even for a specific material or clay-mineral and therefore, as indicated above, a range of capacities for each individual mineral is usually given.

The present preferred exemplary embodiment utilizes a mixture of lime (quicklime) and montmorillonite having replaceable calcium ions, the proportion of lime being anywhere from 50% to 90% by weight of the entire mixture.

A mixture of lime and montmorillonite having replaceable calcium ions is produced by intimately admixing 80% by weight of lime with 20% by weight of montmorillonite.

This mixture is then added to a municipal effluent entering the sewage plant. The muncipal effluent has approximately 10 parts per million of dissolved phosphate expressed as phosphorous. The results are given in the following Table I:

TABLE 1

| Amount added | Phosphate remaining, p.p.m. | Percent removed | pH |
| --- | --- | --- | --- |
| 50 p.p.m. | 6 | 40 | 7.8 |
| 100 p.p.m. | 3 | 70 | 8.4 |
| 150 p.p.m. | 1.5 | 85 | 9.1 |

In the above table, the term "amount added" refers to the total amount of the mixture added. In other words, 100 p.p.m. refers to 80 parts p.p.m. of quicklime and 20 parts p.p.m. of montmorillonite.

The precipitated insoluble phosphate salts are separated from the water by methods well-known in the art, e.g. by filtration.

In order to show the synergistic effect of the addition of montmorillonite to quicklime, there is given below in Table II the result of adding only lime to the same municipal effluent.

TABLE II

| Amount added | Phosphate remaining, p.p.m. | Percent removed | pH |
| --- | --- | --- | --- |
| 50 p.p.m. | 8 | 20 | 8.0 |
| 100 p.p.m. | 7 | 30 | 8.7 |
| 150 p.p.m. | 6 | 40 | 9.4 |

From a comparison of the above tables, it is apparent that 150 parts per million of lime only removed 40% of the dissolved phosphate whereas 150 parts per million of the composition of the present invention removes 85% of the phosphate. This is particularly significant when one considers the fact that lime is much more expensive than montmorillonite and thus the composition of this invention is less expensive than lime and is much more effective.

Of particular significance also is the fact that over 85% of the phosphate is removed utilizing the composition of this invention at a pH of less than 9.5 (about 9) whereas in the case of lime, only 40% of the phosphate is removed at a pH of 9.4.

I have determined that the addition of as little as 10% by weight of montmorillonite clay is almost as effective as the composition exemplified above. Moreover, montmorillonite clay can be added in amounts up to 50% by weight and have still equally as good results.

I have also experimented with other clays such as vermiculite and zeolite and find that when added to lime, a synergistic mixture is obtained.

It should also be noted that it may be advantageous to add a polyelectrolyte in small amounts (say from 1% to 10% by weight based on the total weight of lime and cation exchange material) to the synergistic mixture.

It will be understood that the foregoing description is only illustrative of the present invention and it is not to be limited thereto. Many other cation exchange materials, ways of removing precipitated phosphate, etc. will be apparent to the skilled in the art and all substitutions, alterations and modifications which come within the scope of the appended claims or to which the present invention is readily susceptible without departing from the scope and spirit of this disclosure are considered a part of the present invention.

I claim:

1. A process for removing dissolved phosphates from water by precipitating same as insoluble phosphate salts which comprises:

adding to the waste water containing dissolved phosphate, lime and a cation exchange material having a cation exchange capacity of at least about 20 milliequivalents per 100 grams of cation exchange material, the amount of lime being between 50% to 90%, by weight, based on the amount of cation exchange material and lime, the amount of lime and cation exchange material added to said waste water being sufficient to remove 80% of the dissolved phosphate contained in said waste water but being insufficient to raise the pH above 9.5, thereby precipitating the soluble phosphate as insoluble phosphate salts.

2. A process according to claim 1 wherein the cation exchange material is an alumino-silicate clay mineral having a cation exchange capacity of at least about 25 milliequivalents per 100 grams of clay mineral.

3. A method according to claim 2 wherein the alumino-silicate clay mineral has a replaceable calcium ion.

4. A method according to claim 2 wherein the alumino-silicate clay mineral is montmorillonite.

5. A method according to claim 4 wherein the montmorillonite has replaceable calcium ions.

6. A process for removing dissolved phosphate in waste water which also contains dissolved $CO_2$ and dissolved hardness-causing substances by adding a treating agent which precipitates the phosphate as insoluble phosphate salts but which is not substantially affected by dissolved $CO_2$ or dissolved hardness-causing substances, said precipitation of said phosphates occurring at a pH below about 9.5, said treating agent consisting essentially of lime and a cation exchange material having a cation exchange capacity of at least about 20 milliequivalents per 100 grams of cation exchange material, the amount of cation exchange material in said treating agent being between 50% and 10%, by weight based on the amount of lime, and cation exchange material added to said waste water being sufficient to remove 80% of the dissolved phosphate contained in said waste water but being insufficient to raise the pH above 9.5.

7. A process according to claim 6 wherein the cation exchange material is an alumino-silicate clay mineral having a cation exchange capacity of at least about 25 milliequivalents per 100 grams of clay mineral.

8. A method according to claim 7 wherein the alumino-silicate clay mineral has a replaceable calcium ion.

9. A method according to claim 7 wherein the alumino-silicate clay mineral is montmorillonite.

10. A method according to claim 9 wherein the montmorillonite has replaceable calcium ions.

References Cited

UNITED STATES PATENTS

| | | | |
|---|---|---|---|
| 1,535,709 | 4/1925 | Booth | 210—52 |
| 2,281,759 | 5/1942 | Gelder | 210—52X |
| 2,420,340 | 5/1947 | Ryznar | 210—52 |
| 2,795,545 | 6/1957 | Gluesenkamp | 210—52X |
| 3,130,167 | 4/1964 | Green | 210—52X |
| 3,174,928 | 3/1965 | Kekish | 210—52X |
| 3,480,144 | 11/1969 | Barth et al. | 210—18X |
| 3,487,928 | 1/1970 | Canevari | 210—51X |

FOREIGN PATENTS

| | | | |
|---|---|---|---|
| 826,770 | 1/1960 | Great Britain | 210—52 |

OTHER REFERENCES

Betz Handbook of Industrial Water Condition, Betz Laboratories, Inc., Phila. 24, Pa. fifth edit., 1957, pp. 1–3.

MICHAEL ROGERS, Primary Examiner

U.S. Cl. X.R.

210—37, 51; 252—175